O. N. TEVANDER.
CLOSURE APPLYING MACHINE.
APPLICATION FILED AUG. 20, 1919.
1,431,341.
Patented Oct. 10, 1922.
11 SHEETS—SHEET 1.
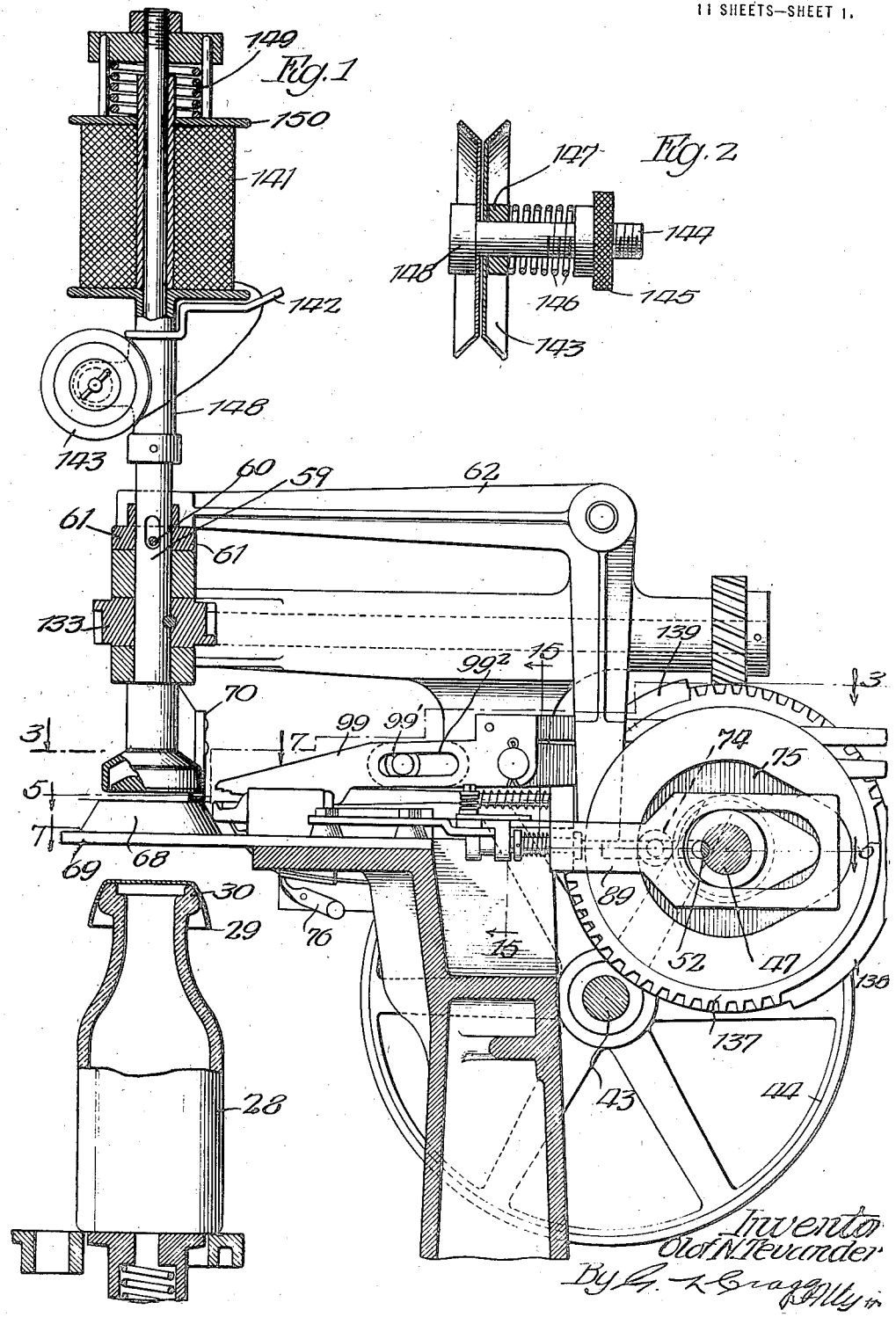

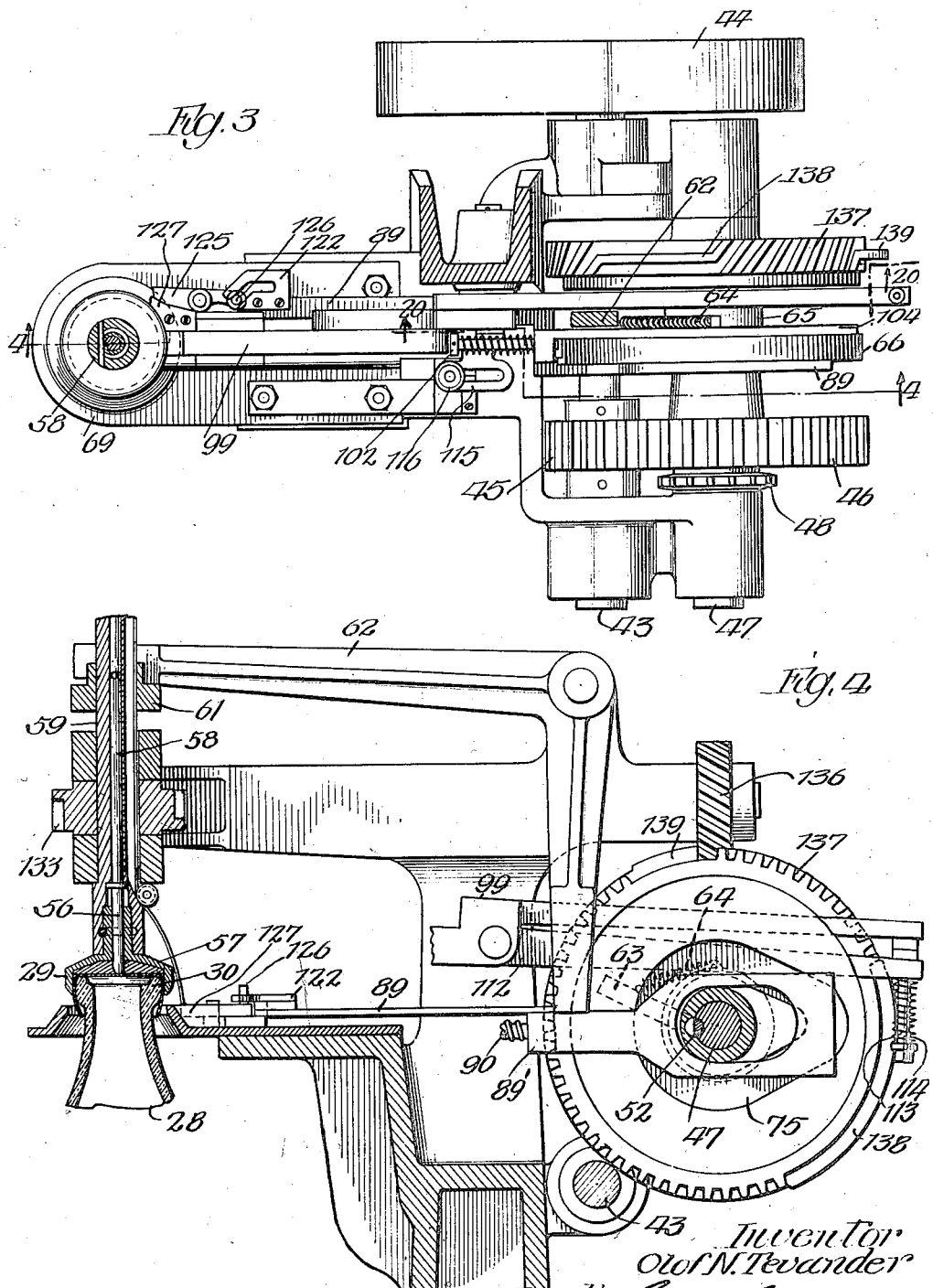

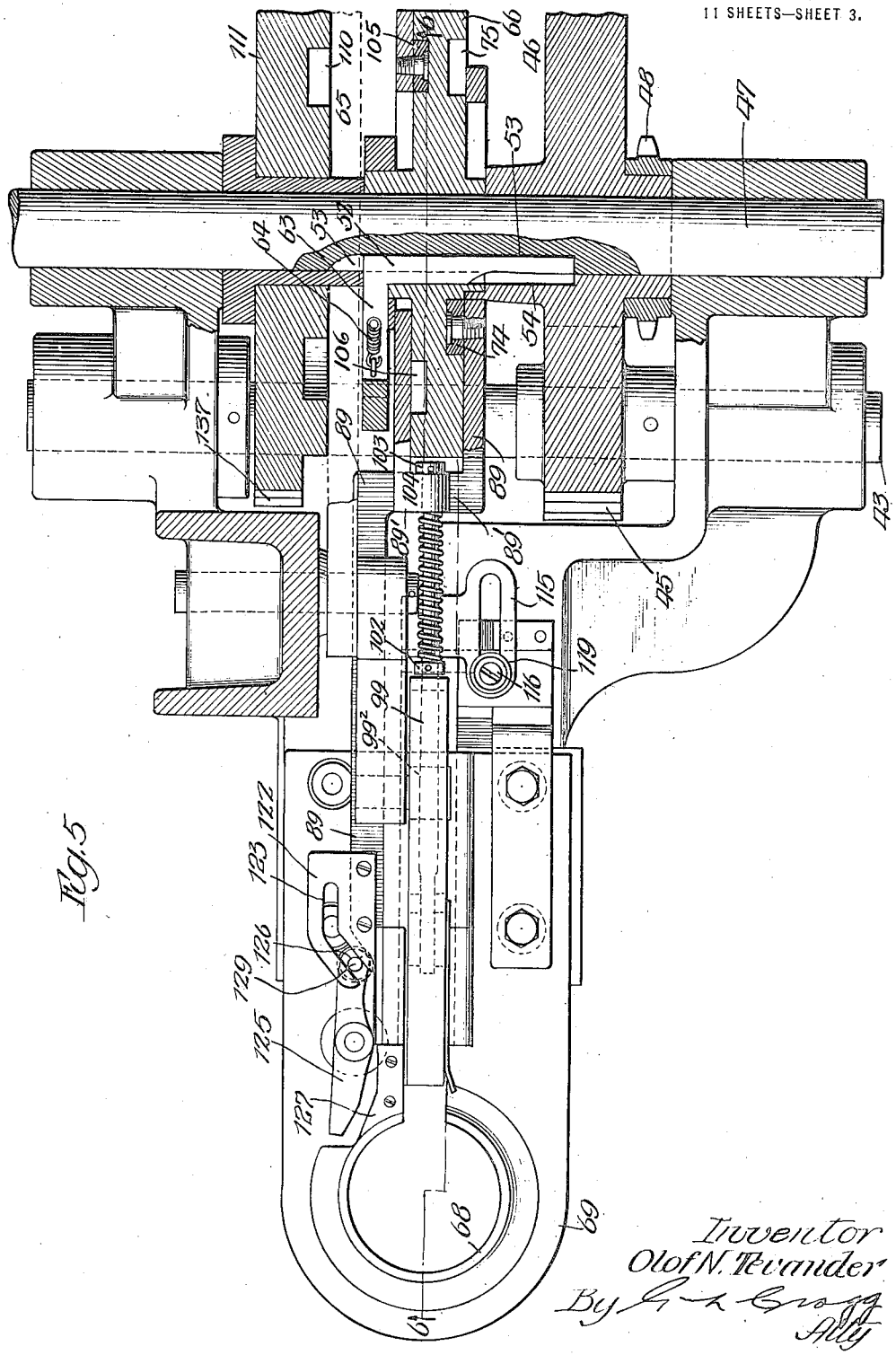

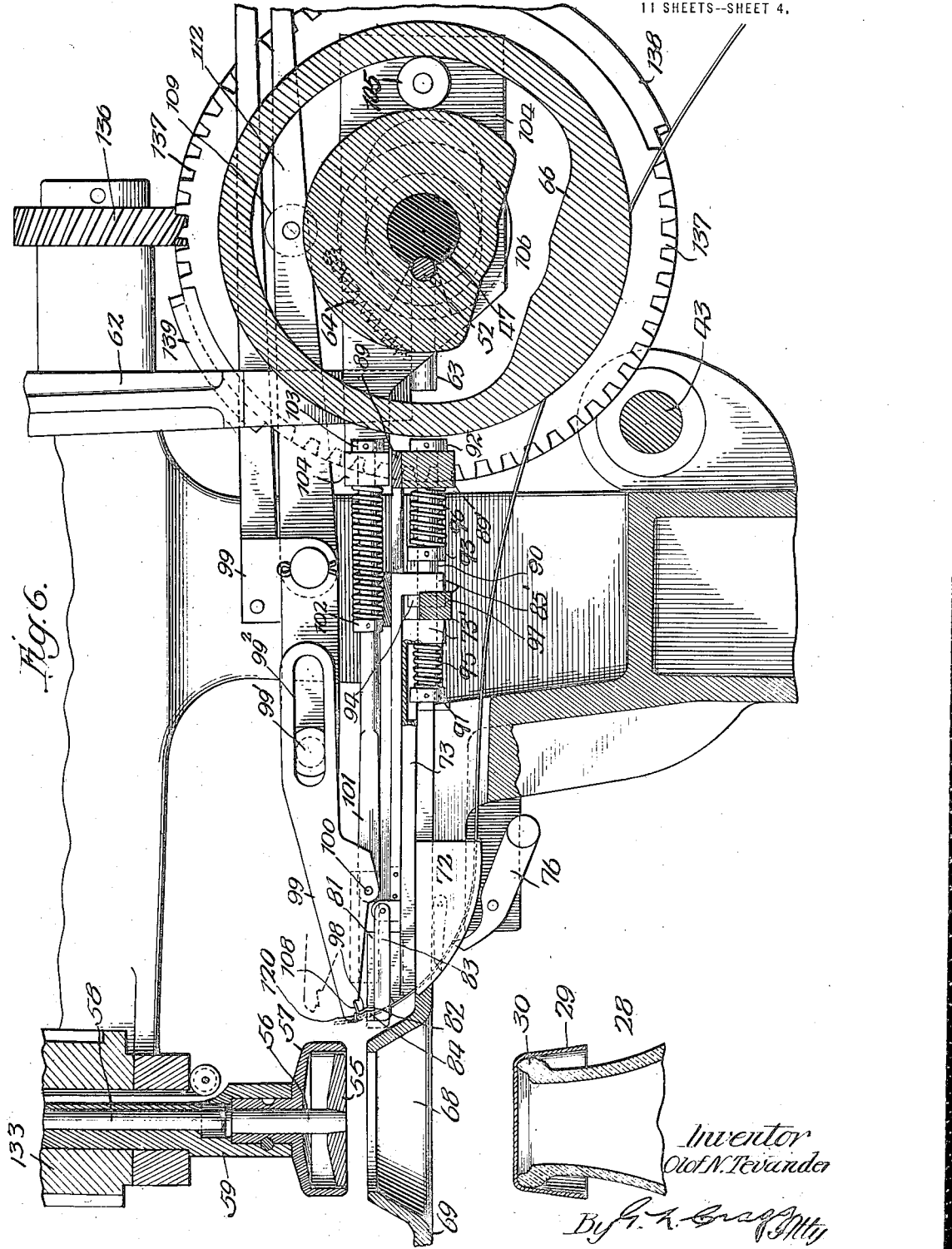

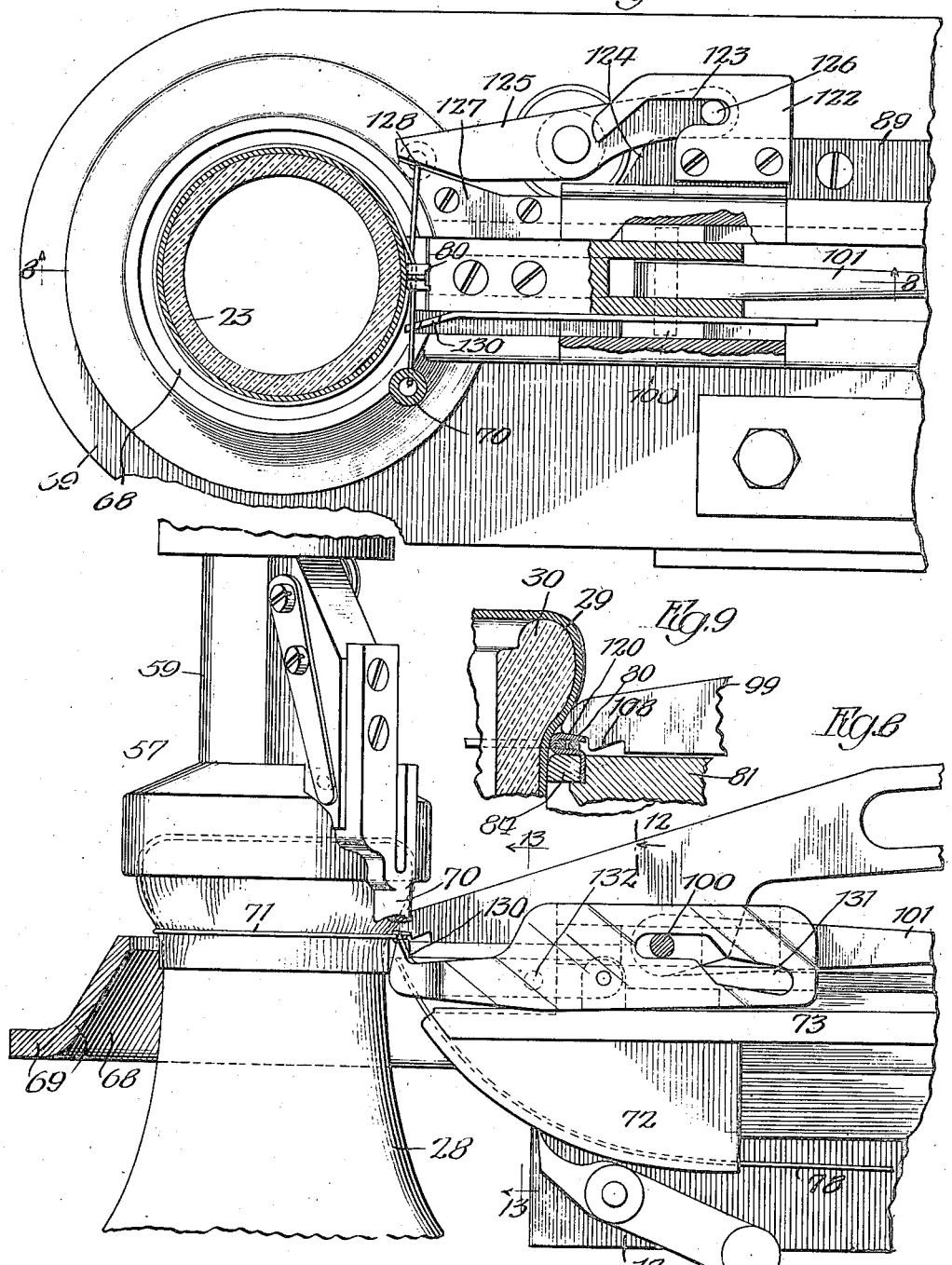

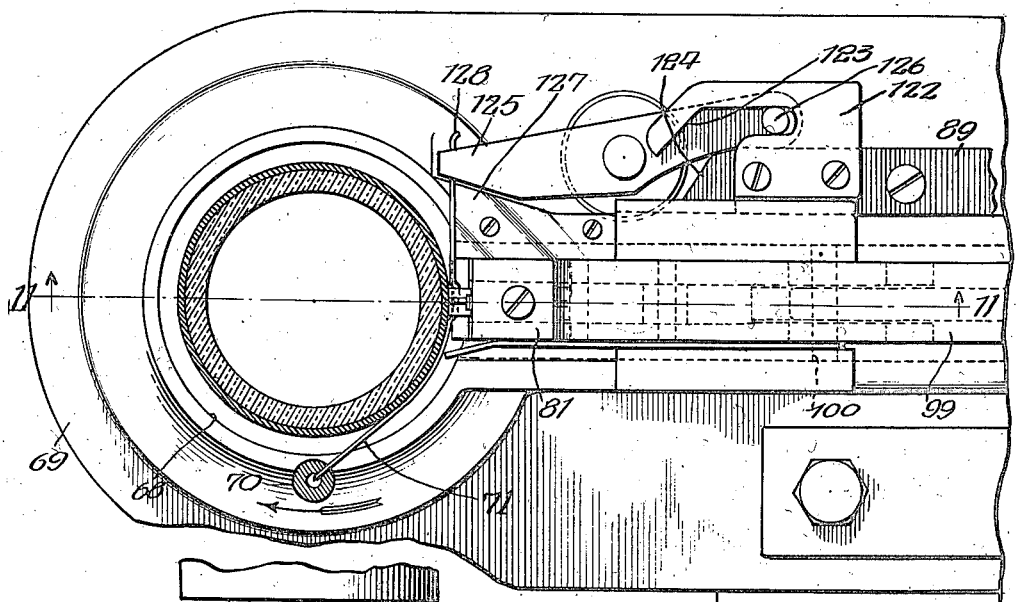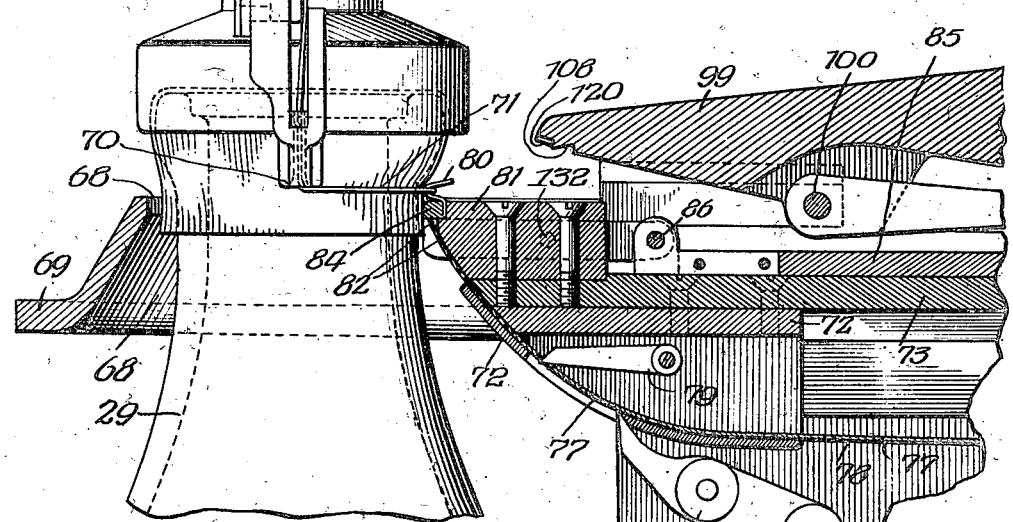

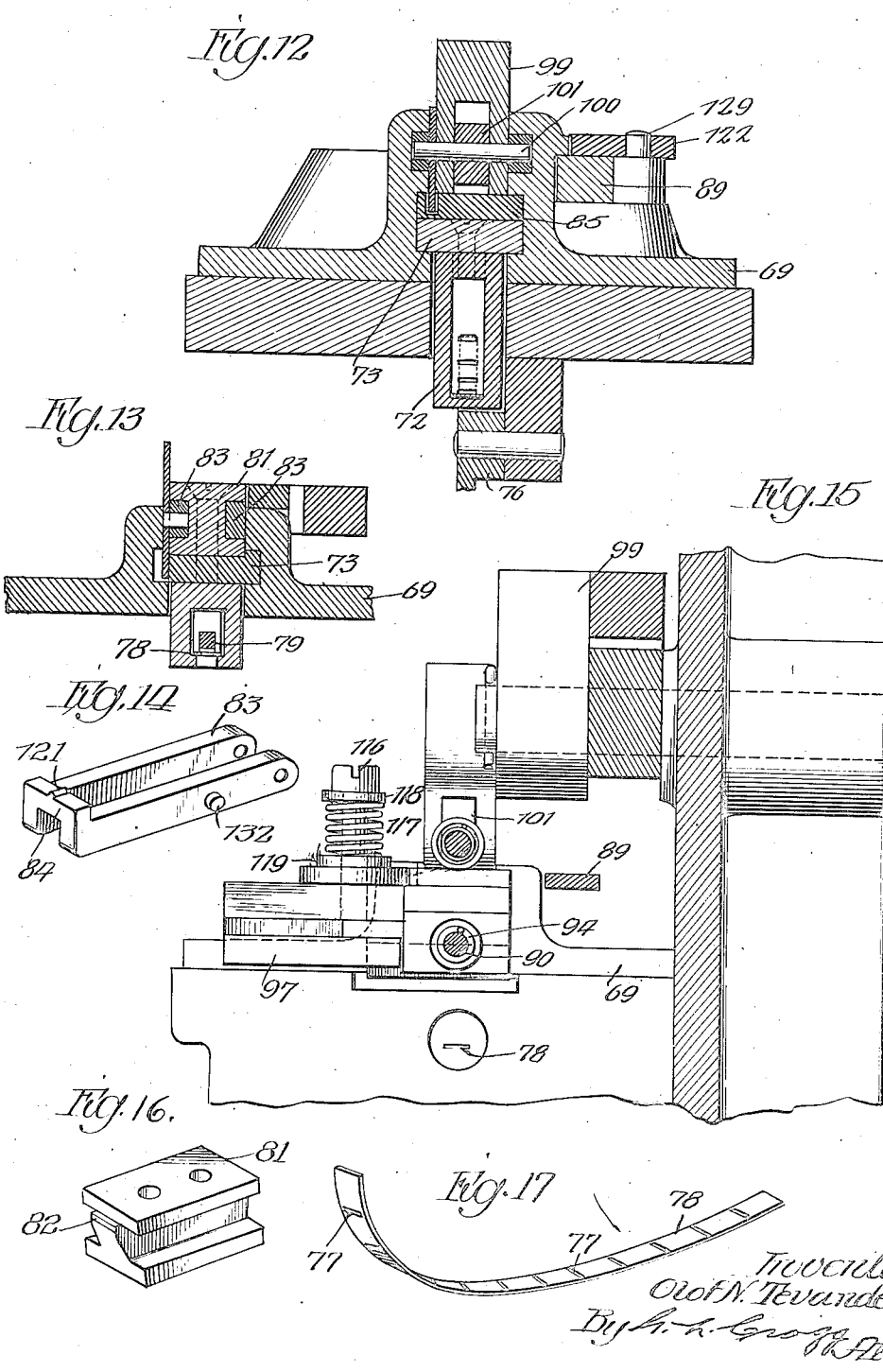

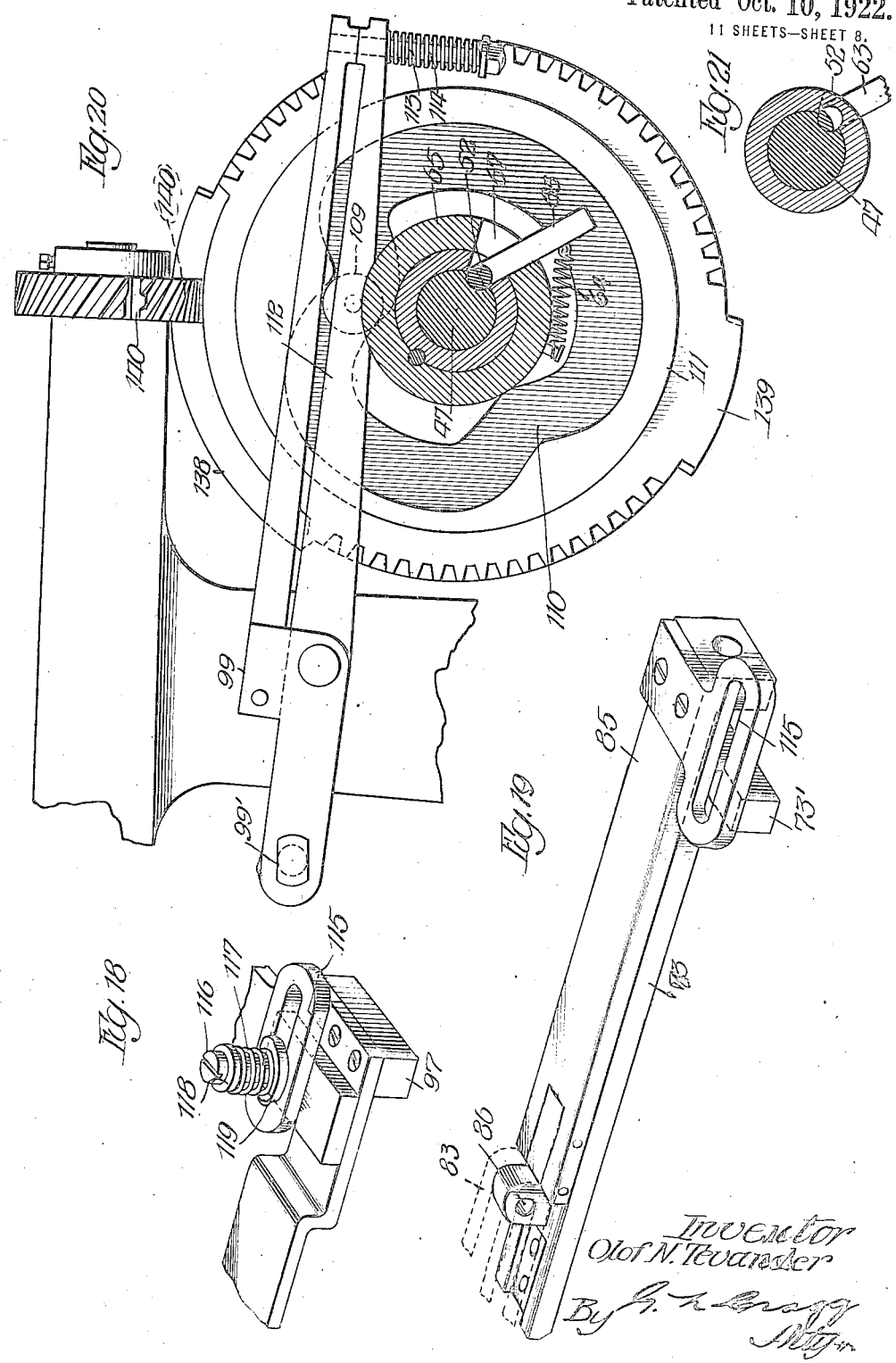

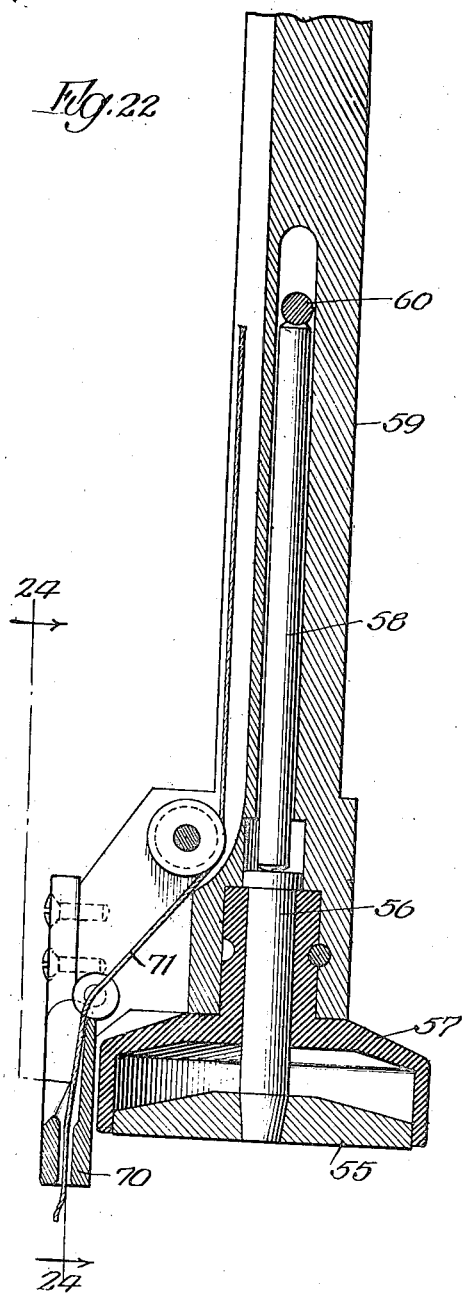
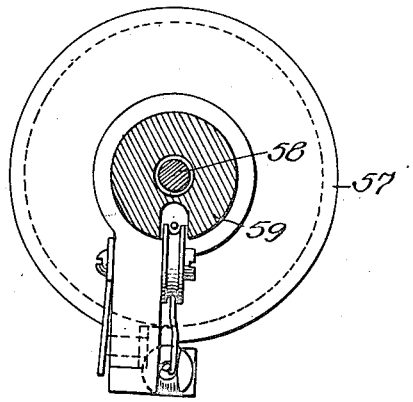
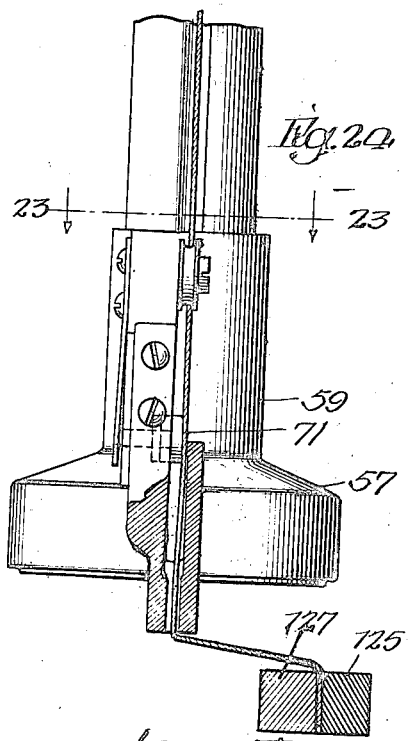

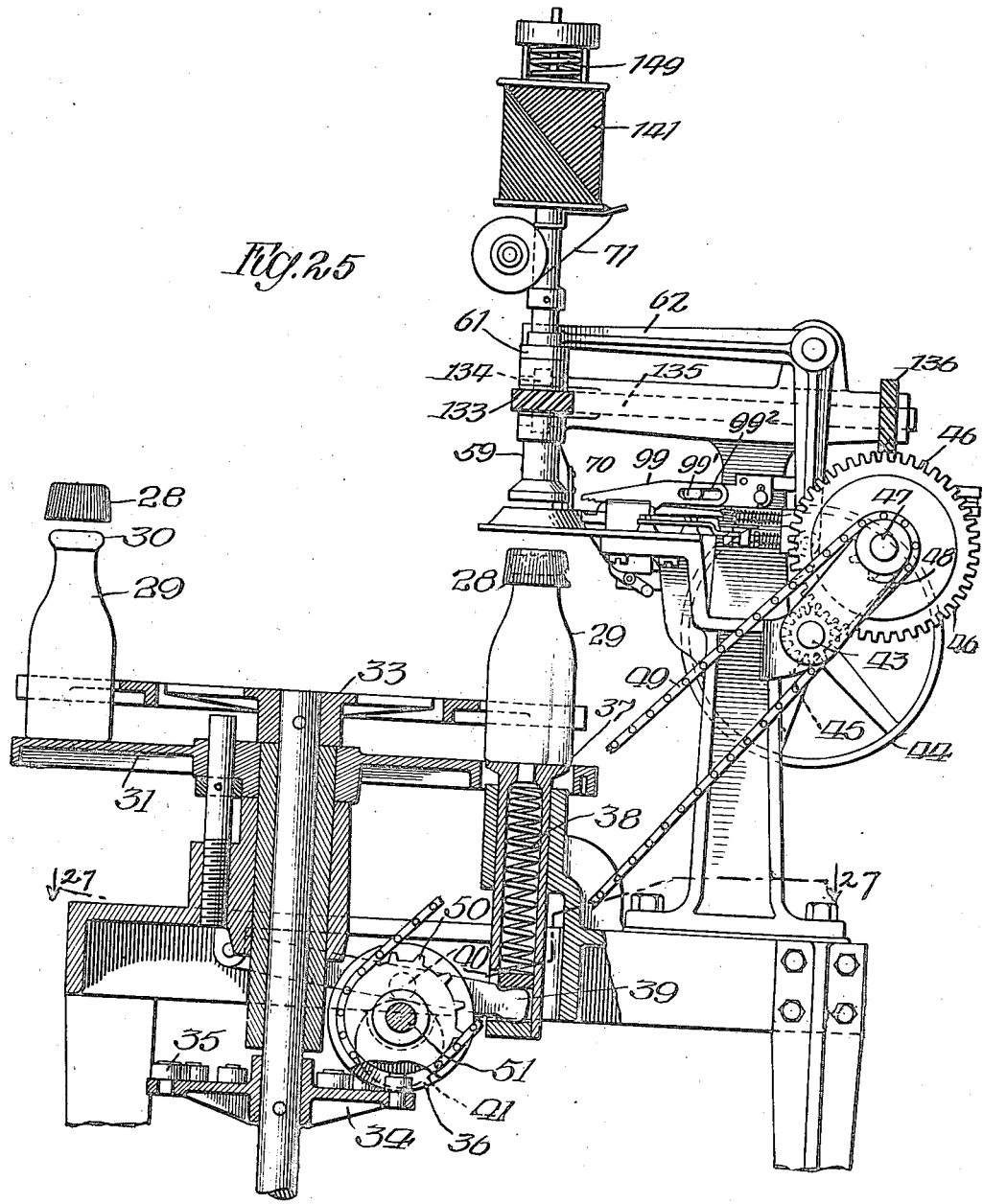

O. N. TEVANDER.
CLOSURE APPLYING MACHINE.
APPLICATION FILED AUG. 20, 1919.
1,431,341.
Patented Oct. 10, 1922.
11 SHEETS—SHEET 11.
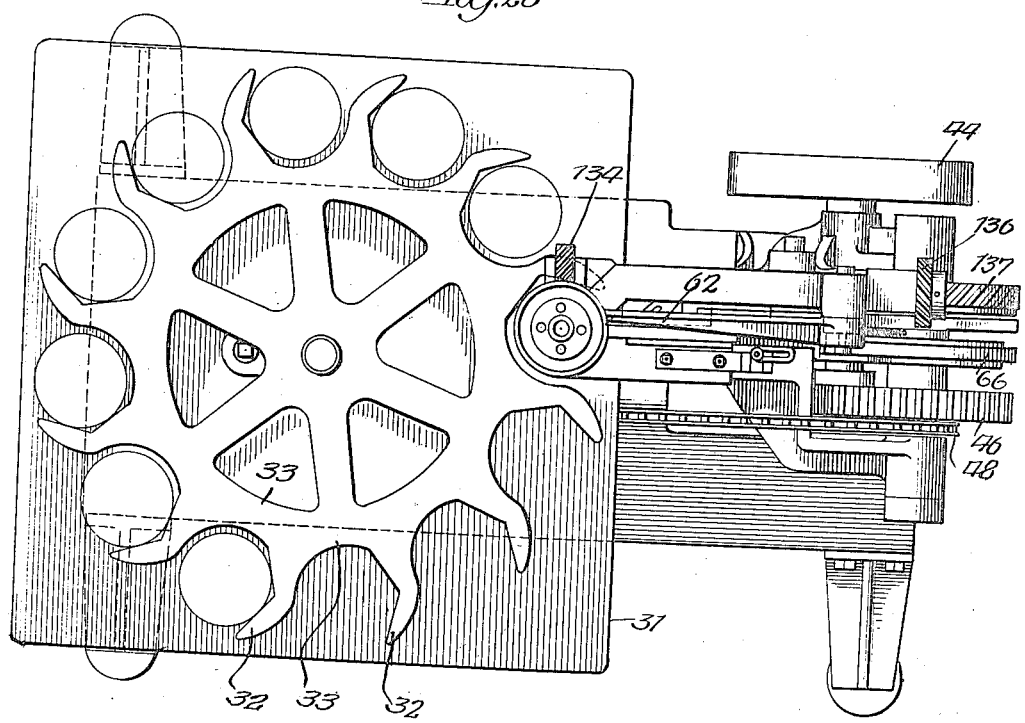
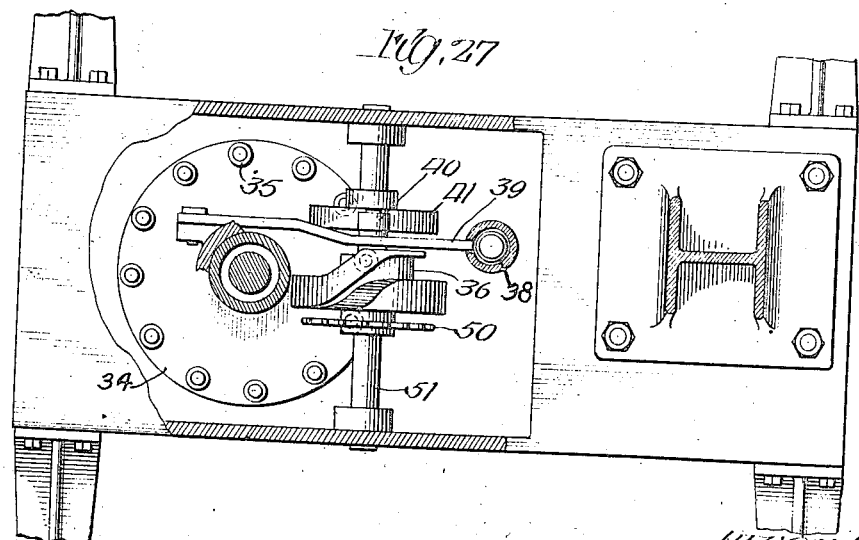

Patented Oct. 10, 1922.

1,431,341

UNITED STATES PATENT OFFICE.

OLOF N. TEVANDER, OF CHICAGO, ILLINOIS, ASSIGNOR TO STANDARD CAP AND SEAL CORPORATION, OF CHICAGO, ILLINOIS, A CORPORATION OF VIRGINIA.

CLOSURE-APPLYING MACHINE.

Application filed August 20, 1919. Serial No. 318,680.

*To all whom it may concern:*

Be it known that I, OLOF N. TEVANDER, citizen of the United States, residing at Chicago, in the county of Cook and State of Illinois, have invented a certain new and useful Improvement in Closure-Applying Machines, of which the following is a full, clear, concise, and exact description.

My invention relates to machines for applying closures to containers and finds a very useful embodiment in a machine constructed to apply skirted caps to the beaded mouths of milk bottles, though the invention is not to be limited to this particular utility.

A machine for this purpose was hitherto invented by me, forming the subject matter of my United States Patent 1,219,791, dated March 20, 1917. In certain of its aspects my present invention is an improvement upon the machine disclosed in the aforesaid patent. In accordance with certain characteristics thereof these machines apply strings or bands about the skirts of closure caps, there being mechanism whereby the ends of the strings are fastened together after the strings have been drawn taut, to maintain the assembly of the caps and the receptacles to whose mouth portions the caps are applied.

The string employed is preferably circular in cross section and is desirably non-metallic and considerably thicker than coarse sewing thread, though I do not wish to be limited to the thickness or shape of the string nor to the material of which it is formed.

In carrying out one feature of my present invention the string is wound upon the cap skirt and preferably completely about the cap skirt to have overlapping ends. The advantage in winding the string around the cap skirt instead of initially forming the string with a loop that receives the receptacle is that the string may be applied throughout the circle of the cap or to so much of the cap as is to be engaged by the string with equal tension at all places, puckering or slackening of the string at any place therein being eliminated whereby the uniform application of the cap skirt to the receptacle is insured.

My invention, in another of its characteristics, resides in the provision of means whereby the receptacle to which a closure is to be applied may set the closure applying mechanism into operation and while this feature of my invention is of particular service in conjunction with other features of the invention I do not wish to be limited to the association of this particular feature with such other features.

The invention has other characteristics and will be fully set forth by reference to the accompanying drawings showing the preferred embodiment thereof and in which Fig. 1 is a view, partially in section and partially in elevation, illustrating the closure applying mechanism of my invention and a portion of a support for bottles or other receptacles to which closures are to be applied; Fig. 2 illustrates a detail of construction; Fig. 3 is a sectional view on line 3—3 of Fig. 1; Fig. 4 is a sectional view on line 4—4 of Fig. 3; Fig. 5 is a sectional view on line 5—5 of Fig. 1; Fig. 6 is a sectional view on line 6—6 of Fig. 5; Fig. 7 is a sectional view on line 7—7 of Fig. 1; Fig. 8 is a sectional view on line 8—8 of Fig. 7; Fig. 9 is a detail illustrating the final step which is performed in effecting the application of a skirted cap to the mouth of a receptacle; Fig. 10 is a view generally similar to Fig. 7 but illustrating parts in different relation; Fig. 11 is a sectional view on line 11—11 of Fig. 10; Fig. 12 is a sectional view on line 12—12 of Fig. 8; Fig. 13 is a sectional view on line 13—13 of Fig. 8; Fig. 14 is a perspective view of the cutting element which preferably enters into the formation of the machine; Fig. 15 is a sectional view on line 15—15 of Fig. 1; Fig. 16 illustrates an element complemental to the cutting element illustrated in Fig. 14; Fig. 17 illustrates a strip of metal from which string fastening clips may be made; Figs. 18 and 19 illustrate details of construction; Fig. 20 is a sectional view on line 20—20 of Fig. 3; Fig. 21 is a detail of a part shown in Fig. 20; Fig. 22 is a longitudinal sectional view through the bottle positioning and string winding structure; Fig. 23 is a sectional view on line 23—23 of Fig. 24; Fig. 24 is a sectional view on line 24—24 of Fig. 22; Fig. 25 is a view in side elevation, partially in section, of practically the entire machine; Fig. 26 is a plan view of the structure illustrated in Fig. 25; and Fig. 27 is a sectional view on line 27—27 of Fig. 25.

Like parts are indicated by similar characters of reference throughout the different figures.

The machine illustrated is designed to apply skirted closure caps 29 to bottles 28 having outsetting beads 30 surrounding their mouth portion, though it is to be understood that the machine is not to be limited to any particular form of receptacle to which it may apply closures, nor to the particular form of closures, in all embodiments of the invention, applied thereby to the receptacles.

I have illustrated a stationary table 31 upon which the bottles are placed, these bottles being received in the spaces between adjacent teeth 32 of the rotatable toothed wheel 33. The shaft of this wheel carries a disc 34 upon which cam rollers 35 are disposed in a circular row. These cam rollers are successively brought into engagement with the cam 36 by this cam to cause the intermittent rotation of the disc 34 and the wheel 33 in fixed relation therewith. By this mechanism bottles are successively placed upon the upper end of a sleeve or bottle support 37 which houses a spring 38. A lever 39 projects into the bore of said sleeve. This lever carries a cam roller 40 operable by the cam 41 upon the shaft 51, the cam operating to effect upward movement of the lever 39 to raise the sleeve 37 through the intermediation of the spring 38 which is engaged by the operating end of said lever, the spring preventing the breakage of the bottle if the bottle should encounter any unusual obstruction to its upward movement. The spring also serves to restore the lever 39 to its lowermost position, a result which occurs after the bottle has been capped and is to be shifted to a discharging position by the wheel 33, a new bottle being now brought by the wheel 33 upon the upper end of the sleeve 37 to be capped. The wheel 33 is at rest during the time that the lever 39 is not in its lowermost position so that the wheel 33 and the bottles engaged thereby are not in operation during the time that the bottle is being placed in position to be capped, is being capped, and is being restored to its lowermost position.

The main shaft 43 is suitably driven as, for example, by means of the belt driven pulley 44 upon the same shaft therewith. The shaft 43 carries a spur pinion 45 which is in mesh with the spur gear 46, these gears constantly rotating. The spur gear 46 is upon a shaft 47 and carries a sprocket wheel 48 that is in driving relation to a sprocket chain 49. This sprocket chain drives a sprocket gear 50 which is fixed upon a shaft 51 on which the cams 36 and 41 are disposed.

Clutching mechanism, indirectly controlled by the bottle, is employed for coupling the shaft 47 with the constantly rotating gear 46 whereby the machine is operated each time a bottle is elevated into a position to be capped. The form of clutching mechanism illustrated includes a clutching pin 52 (Fig. 5). This pin is permanently received in a groove 53 in the shaft 47 in which groove the pin may turn. The pin may project into the plane of rotation of the gear wheel 46 and the hub of this wheel and where it thus may project it is cut away so that it may lie wholly within the circle of rotation of the shaft 47 or may intercept this circle of rotation when a recess 54 in the wheel 46 is brought into registry with the recess 53. When the pin is turned to a position in which its forward end is in both recesses 53 and 54, the wheel 46 and the shaft 47 are coupled, whereupon the shaft 47 is caused to rotate to operate the mechanism for applying the closures to the bottles. The pin 52 is turned from its non-clutching position to its clutching position by the bottle when actuated through the intermediation of mechanism which will now be described, the bottle support 37 holding the bottle in operating and holding relation to the clutching mechanism during the time that the closure is being applied. The bottle support 37 is located in vertical alignment with the follower 55 carried upon the lower end of a vertical pin 56 which is reciprocable with respect to the socket 57 that is designed to receive the bead at the bottle mouth to maintain the bottle upright and in axial alignment with the pin 56 during the capping operation. A pin 58 rests upon the upper and headed end of the pin 56, the pin 58 being movable within the bore of the sleeve 59 to which the centering socket 57 is secured. A pin 60 extends transversely through the bore in the sleeve 59, this pin 60 being movable lengthwise of its sleeve. The pin 60 is secured to the collar 61 that surrounds the sleeve 59, the collar being moved upwardly along said sleeve by the pins 56 and 58 whenever the follower 55 is elevated by a rising bottle, the descending movement of the collar 61 following the descent of the bottle after the capping operation. When the collar 61 is raised it elevates the outer end of the horizontal branch of the bell crank lever 62 whose elbow is pivoted upon the frame of the machine.

The lower end of the upright branch of this bell crank lever normally overlies and is normally engaged by the arm 63 extending transversely from the clutching pin 52 at the base thereof, this engagement being maintained by a spring 64 secured at one end to the clutching pin arm 63 and at its other end to a collar 65 fixed upon the hub of the cam disc 66 which in turn is fixed upon the shaft 47. As will be understood, this engagement effected between the clutching pin arm 63 and the lower end of the upright branch of the bell crank is maintained until the bottle is raised to elevate the follower 55 which will occasion a clockwise turning movement of the bell crank (Fig. 4) to remove the bell crank from engagement with the clutch pin arm 63, permitting the spring 64 to turn the clutch pin 52 in a clockwise direction when the recess 54 in the gear wheel 46 is brought into registry with the recess 53. The clutch pin arm 63 moves within the V-shaped recess 67 in the collar 65 and the contiguous portion of the hub of the cam disc 66.

When the bottle descends after having been capped by the mechanism to be described, the bell crank 62 will be turned in a counter-clockwise direction due to the weight of its horizontal branch so that the gear wheel 46, which turns in a clockwise direction (Figs. 4 and 5) may reestablish engagement of the clutch pin arm 63 with the bell crank lever to cause counter-clockwise movement of the clutch pin to restore the forward end of this pin completely to the groove 53 and thereby bring this pin out of engagement with the constantly rotating gear 46 whereupon the cap applying mechanism is brought to rest to operate again when a new bottle is sufficiently elevated again to start a new operation.

It will be observed that the follower 55 is limited in its movement with respect to the bottles toward and from the bottles whereby ample space intervenes between the same and the bottles to permit of the application of skirted caps to the mouth portions of the bottles, this follower operating to hold the caps to such mouth portions during the operation of the mechanism that securely applies the caps to the bottles. If the skirt of the cap should flare materially it is contracted during the upward movement of the bottle by passing through the hole 68 in the fixed bottle guiding portion 69 of the machine.

When the bottle is fully elevated the zone thereof just below its bead at its mouth is in the plane of the lower end of the tubular guide 70 through which guide the string 71 (of suitable size and shape) is passed as the string is wound about the skirt of the cap, as will more fully appear. The string engaging element 70 turns substantially upon the axis of the bottle.

The fastening elements which are employed for gripping the ends of the string that preferably overlap are desirably made from strip metal formed as illustrated in Fig. 17. This strip metal is supplied from a reel or other source and passes through the interior of the hollow block 72 secured to the slide bar structure 73 that slides upon the machine and is actuated by a cam roller 74, as will more fully appear, working within a cam groove 75 in the cam disc 66. When the block 72 is withdrawn toward the shaft 47 the stationarily mounted pawl 76 will engage a notch 77 in the metal strip 78 to feed this metal strip forwardly with respect to said block until the holding pawl 79 within the block 72 engages another notch 77 to prevent reverse movement of the metal strip and to maintain the strip sufficiently projected above the block 72 so that enough of the metal strip may be cut away, as hereinafter set forth, to form a fastening element. When this feeding of the metal strip has been secured, the block 72 is moved to its foremost position away from the shaft 47 carrying with it the holding pawl 79 that continues to maintain the metal strip in its new position with respect to the block 72, the block 72 in this forward movement carrying the strip out of engagement with the feeding pawl 76 so that this feeding pawl, in the next withdrawing movement of the block, may engage an ensuing notch 77 to effect a fresh feeding movement of the metal strip. The illustrated mechanism for cutting off sufficient portions of the metal strip to form the fastening elements 80 includes a cutting block 81 fixed with respect to the block 72 and having a cutting edge 82 at its forward end. This block, illustrated more clearly in Fig. 16, has side grooves in which the sides of the U-shaped cutter 83 are received, this cutter being upwardly deflected to overlie, at its forward end, the portion of the block 81 having the cutting edge 82. The cutter 83 has a cutting edge 84 co-operating with the cutting edge 82 to cut off the required lengths of the metal strip. The cutter 83 is movable with respect to the block 81 being operable back and forth by a slide bar 85 pivotally connected with the rear end of the cutter 83 by the pin 86.

The cam roller 74 is mounted upon the bar 89 that reciprocates both bars 73 and 85. A rod 90 slidably passes through the rear and offset end 73′ of the bar 73 and also through the transverse mid portion 89′ of the bar 89. This rod has enlargements 91, 92 upon its ends and enlargements 93, 94 at intermediate portions. A spring 95 is interposed between the enlargements 91 and the end 73′ of the bar 73. Another spring 96 is interposed between the enlargement 93 and the bar portion 89′. The enlargement 94 is engageable with the front face of the angular rear end 85′ of the bar 85, which does not engage stop 97. The cam groove 75 will, through the intermediation of the cam roller 74, cause the bar 89 to reciprocate. When this bar moves toward the rear it engages the rod enlargement 92 to pull the rod 90 rearwardly, the rod enlargement 91 pressing rearwardly upon the spring 95 that presses rearwardly upon the bar portion 73′ to move the bar 73 rearwardly until its portion 73′ is obstructed in this movement by the stop 97, the spring 95 yielding during further rearward movement of the rod 90, this rod continuing in its movement after the bar 73' strikes the stop 97 to permit continued rearward movement of the rod enlargement 94 that moves the bar 85 further rearwardly to effect movement of the cutter 83 upon and with respect to the block 81 to cut a portion of metal from the metal strip 78.

After a portion of the metal strip has been cut off and gripped between the parts 81 and 83, and while the cutting and gripping members 81 and 83 are in their rearmost positions, this cutoff portion is formed with a string receiving groove 98 by means of a forming lever made in two sections 99 which are so coupled by the flattened pin 99' upon one section working within the slot 99² upon the other section that the length of the lever may be altered to avoid disturbance of the adjustment of the lever elsewhere while at the same time so relating the two sections of the lever that they will together turn upon the fulcrum pin 100. The fulcrum 100 is shiftable, being upon a cam bar 101. This cam bar carries an enlargement 102 at an intermediate portion thereof and an enlargement 103 at its rear end. This cam bar passes through a transverse continuation of the cam plate 104. This cam plate carries a cam roller 105 working within a cam groove 106 in the cam 66. During the formation of the groove the fulcrum 100 is not shifted with respect to the block 81. The actual formation of the groove 98 is caused by the part 108 of the forming bar 99 which is moved upon its fulcrum 100 toward the block 81 by means of the cam roller 109 operating within the cam groove 110 in the cam 111. This cam roller is mounted upon an arm 112 pivoted at its front end to the bar 99 and pressed at its rear end into engagement with the rear end of the bar 99 by means of a spring 113 surrounding a rod 114 passing through the arm 112 and carried by the bar 99. The spring 113 is stiff enough to bend the metal strip portion to form the groove 98 but will yield when the fastening element having a groove 98 is collapsed into engagement with the string. After the groove 98 has been formed the bar 89 is moved forwardly, the portion 89' of this bar press upon the rod enlargement 93 whereby forward movement of the rod 90 is effected. The enlargement 94 is brought into forward pushing engagement with the bar portion 73' to hold the cut and now formed portion of the metal strip 78 against the cutter 83 whose forward movement is retarded by the friction producing structure that includes the slotted member 115 attached to the bar 85, the rod 116 passing through the slot in the members 115, the spring 117 and the washers 118, 119 surrounding the rod 116, the spring serving to press the lower washer 119 into frictional engagement with the member 115 whereby the bar 83 is maintained in gripping engagement with the cutoff and formed portion of the metal strip by having its relation with the block 81 maintained. The spring 96 is adapted to move the bar 73 further forward than would be required by the smallest bottle, the spring permitting this bar, and the associate bar 85, to adapt themselves to the varying sizes of the bottles.

The fastening element 80 is placed in the zone in which the string 71 is wound by mechanism later to be set forth, the groove of this fastening element being so located that the string will lie therein and have its ends overlapping in this groove. During the forward movement that positions the fastening element against the skirt of the cap the forward movement of the bar 99 is reduced by shifting the fulcrum 100 rearwardly with respect to the block 81 whereby the crimping groove 120 will overlie the fastening element 80 and the correspondingly shaped crimped rib 121, formed upon the top of the cutting element 83. The formations 120 and 121 extend across the string that is within the groove 98. The bar 99 thus not only takes part in forming the fastening element but also serves to close the walls of the groove into clamping engagement with the overlapping ends of the string and also serve to crimp these walls crosswise of the string so that it will be impossible to remove the bottle cap without either mutilating the string or the seal to such an extent as to make detection unavoidable.

I will now describe the preferred mechanism for effecting such relative movement between the bottle and its cap and the string as to cause the string to be wound thereupon, it being preferred to maintain the bottle stationary during the winding operation although the invention is not to be limited to this arrangement.

The bar 89 carries a block 122 in which there is a cam slot 123. The forward end of the bar 89 has a sloping cam surface 124. A string gripping lever 125 carries a roller 126 at its rear end that works upon the surface 124 so that as the bar 89 moves forwardly the lever 125 will be closed against the stationary block 127 to grip one end of the string 128 preparatory to the winding operation of the string. When the rod 89 is moved rearwardly the pin 129, that extends into the slot 123, is moved in a clockwise direction to move the lever 125 from the block 127 preparatory to receiving a fresh end of the string in the ensuing closure applying operation. After one end of the string has been gripped between the lever 125 and the block 127 the tubular guide 70 is bodily rotated in a clockwise direction from the position shown by dotted lines in Fig. 10 to wind the string around the skirt of the cap and into the groove in the fastening element, the winding movement of the tubular guide 70 ceasing when it reaches the position shown in full lines in Fig. 10. The string crosses or overlaps in the groove of the fastening element 80. The guide 70 is arrested in this latter position and it, in conjunction with the jaws 125 and 127, pull upon the string tightly to apply it to the skirt of the cap and maintain the string under tension while the fastening element is being collapsed into engagement with the string as hitherto set forth. Throughout the winding operation the guide 70, in conjunction with the jaws 125 and 127 maintain this string under tension and press it against the skirt of the cap so that the binding engagement of the string is uniform throughout the circle of the cap skirt. After the fastening device has been applied to the string to hold it in tight engagement with the cap the string is cut between the fastening device and the guide 70 whereafter the rotary movement of the guide 70 is continued in its original direction and stops in the position indicated by dotted lines in Fig. 7, the guide then positioning the freshly cut end of the string to be gripped by the jaws 125, 127 preparatory to a new closure applying operation.

The cutting of the string between the fastening element 80 and the guide 70 is effected by the knife 130 whose cutting edge is pressed upwardly toward the string, but not in contact with it, by means of the pin 100 operating in the see-saw slot 131 in the body of the knife 130 which is pivoted at 132 upon the cutting element 83. The raising of the cutting edge of the knife to a position ahead of the string but not in contact therewith, is effected upon the forward movement of the cutter 83, block 81 and the forming lever 99, the pin 100 raising the cutting edge of the knife in travel from the rear and lower end of the slot 131 to the front and upper end of the slot. After the fastening element has been applied to the string the lever 99 is first slightly raised to clear the fastening element and it, together with the cutters 81 and 83, is withdrawn and in this withdrawing movement the cutting edge of the knife 130 slices the string in two, after which the guide 70 resumes its travel to come to rest in its position indicated by dotted lines in Fig. 7.

Any suitable mechanism may be employed for so governing the movements of the guide 70 that it will occupy the position shown by dotted lines in Fig. 7 to permit it to position the end of the string so that this string end may be gripped between the jaws 125 and 127 preparatory to a winding operation to cause the guide thereafter to travel to the position indicated by full lines in Fig. 7 where it is held while the fastening element is being applied to the string and the string is being cut, and finally to complete the cycle of movement of the guide back to its position shown by the dotted lines. The mechanism which I have illustrated for the purpose of thus controlling the movement of the guide 70 includes a skew gear 133 in fixed relation with the sleeve 59 and in mesh with a skew gear 134 upon a shaft 135 which also carries a skew gear 136, this latter skew gear being in mesh with a mutilated skew gear 137. This worm gear has teeth some of which are of normal pitch that serve to turn the skew gear 136 and the parts driven thereby in order to effect the winding movement of the guide 70 around the bottle neck and the cap 10. The crowns of others of these teeth are elongated in the plane of the wheel 137, as indicated at 138, 139, these elongated crowns also being radially projected beyond the circle of the normal teeth of the wheel 137. The gear 136 has two slots extending along its axis of which one, 140, is shown in Fig. 20. One of these slots is individual to and receives one of the elongated tooth crowns of the mutilated gear wheel 137 to arrest the rotation of the gear 136 and the parts driven thereby and the other slot later receives the other one of the elongated tooth crowns. Thus may the guide 70 be arrested over the jaws 125, 127 and later in the position shown by full lines in Fig. 7 while the fastening device is being applied to the string and the string is being cut.

The string may be supplied from any suitable source and under any suitable control. I have illustrated a bobbin or spool 141 from which the string is passed, the string being guided through the fork 142 about the guiding wheel 143 which is prevented from having idle or easy rotation by some friction producing means such as that illustrated in Fig. 2. In this figure there is shown a threaded rod 144 upon which the wheel 143 turns and which rod carries a thumb nut 145 that presses upon the spring 146 that yieldingly maintains the wheel 143 in frictional engagement with the washer 147 upon the rod 144 and the support 148 for the rod 144. This support turns with the sleeve 59 as does also the spool 141 and the guide fork 142. Where the string leaves the wheel 143 it is aligned with the bore of the guide 70. The formation of slack above this guide is prevented by means of the spring 149 that presses a button 150 against the string and presses the string against the upper part of the guide 70.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A machine for applying skirted caps to receptacles including mechanism movable with respect to the receptacles from and toward the receptacles to permit of the application of skirted caps to the mouth portions of the receptacles and operating to hold the caps to such mouth portions; mechanism for winding string upon the skirt of a cap and including a string engaging portion that turns substantially upon the axis of the receptacle; mechanism for fastening the ends of the string applied to a cap; and means common to the aforesaid mechanisms for operating the same in orderly sequence.

2. A machine for applying skirted caps to receptacles including mechanism movable with respect to the receptacles from and toward the receptacles to permit of the application of skirted caps to the mouth portions of the receptacles and operating to hold the caps to such mouth portions; mechanism for winding string upon the skirt of a cap to an extent to have the string overlap and including a string engaging portion that turns substantially upon the axis of the receptacle; mechanism for fastening the ends of the string applied to a cap; and means common to the aforesaid mechanisms for operating the same in orderly sequence.

3. A machine for applying skirted caps to receptacles including mechanism movable with respect to the receptacles from and toward the receptacles to permit of the application of skirted caps to the mouth portions of the receptacles and operating to hold the caps to such mouth portions; mechanism for winding string upon the skirt of a cap and including a string engaging portion that turns substantially upon the axis of the receptacle; mechanism for coupling a fastening element with the ends of the string to hold the ends of the string in relation; and means common to the aforesaid mechanisms for operating the same in orderly sequence.

4. A machine for applying skirted caps to receptacles including mechanism movable with respect to the receptacles from and toward the receptacles to permit of the application of skirted caps to the mouth portions of the receptacles and operating to hold the caps to such mouth portions; mechanism for winding string upon the skirt of a cap to an extent to have the string overlap and including a string engaging portion that turns substantially upon the axis of the receptacle; mechanism for coupling a fastening element with the ends of the string to hold the ends of the string in relation; and means common to the aforesaid mechanisms for operating the same in orderly sequence.

5. A machine for applying skirted caps to receptacles including mechanism movable with respect to the receptacles from and toward the receptacles to permit of the application of skirted caps to the mouth portions of the receptacles and operating to hold the caps to such mouth portions; mechanism for pulling upon and winding string upon the skirt of a cap and including a string engaging portion that turns substantially upon the axis of the receptacle; mechanism for fastening the ends of the string applied to a cap; and means common to the aforesaid mechanisms for operating the same in orderly sequence.

6. A machine for applying skirted caps to receptacles including mechanism movable with respect to the receptacles from and toward the receptacles to permit of the application of skirted caps to the mouth portions of the receptacles and operating to hold the caps to such mouth portions; mechanism for pulling upon and winding string upon the skirt of a cap to an extent to have the string overlap and including a string engaging portion that turns substantially upon the axis of the receptacle; mechanism for fastening the ends of the string applied to a cap; and means common to the aforesaid mechanisms for operating the same in orderly sequence.

7. A machine for applying skirted caps to receptacles including mechanism movable with respect to the receptacles from and toward the receptacles to permit of the application of skirted caps to the mouth portions of the receptacles and operating to hold the caps to such mouth portions; mechanism for pulling upon and winding string upon the skirt of a cap and including a string engaging portion that turns substantially upon the axis of the receptacle; mechanism for coupling a fastening element with the ends of the string to hold the ends of the string in relation; and means common to the aforesaid mechanisms for operating the same in orderly sequence.

8. A machine for applying skirted caps to receptacles including mechanism movable with respect to the receptacles from and toward the receptacles to permit of the application of skirted caps to the mouth portions of the receptacles and operating to hold the caps to such mouth portions; mechanism for pulling upon and winding string upon the skirt of a cap to an extent to have the string overlap and including a string engaging portion that turns substantially upon the axis of the receptacle; mechanism for coupling a fastening element with the ends of the string to hold the ends of the string in relation; and means common to the aforesaid mechanisms for operating the same in orderly sequence.

9. A machine for applying skirted caps to receptacles including mechanism movable with respect to the receptacles from and toward the receptacles to permit of the application of skirted caps to the mouth portions of the receptacles and operating to hold the caps to such mouth portions; mechanism for placing a fastening element at the skirt of the cap; mechanism for winding string upon the skirt of a cap and the fastening element to an extent to have the string overlap upon the fastening element; mechanism for coupling the fastening element with the ends of the string to hold the ends of the string in relation; and means common to the aforesaid mechanisms for operating the same in orderly sequence.

10. A machine for applying skirted caps to receptacles including mechanism movable with respect to the receptacles from and toward the receptacles to permit of the application of skirted caps to the mouth portions of the receptacles and operating to hold the caps to such mouth portions; mechanism for placing a fastening element at the skirt of the cap; mechanism for pulling upon and winding string upon the skirt of a cap and the fastening element to an extent to have the string overlap upon the fastening element; mechanism for coupling the fastening element with the ends of the string to hold the ends of the string in relation; and means common to the aforesaid mechanisms for operating the same in orderly sequence.

11. A machine for applying skirted caps to receptacles including mechanism movable with respect to the receptacles from and toward the receptacles to permit of the application of skirted caps to the mouth portions of the receptacles and operating to hold the caps to such mouth portions; mechanism for forming grooves in fastening elements; mechanism for placing a fastening element at the skirt of the cap; mechanism for winding string upon the skirt of a cap and within the groove of the fastening element to an extent to have the string overlap within the groove of the fastening element; mechanism for closing the walls of the groove upon and into clamping engagement with the overlapping ends of the string; and means common to the aforesaid mechanisms for operating the same in orderly sequence.

12. A machine for applying skirted caps to receptacles including mechanism movable with respect to the receptacles from and toward the receptacles to permit of the application of skirted caps to the mouth portions of the receptacles and operating to hold the caps to such mouth portions; mechanism for forming grooves in fastening elements; mechanism for placing a fastening element at the skirt of the cap; mechanism for pulling upon and winding string upon the skirt of a cap and within the groove of the fastening element to an extent to have the string overlap within the groove of the fastening element; mechanism for closing the walls of the groove upon and into clamping engagement with the overlapping ends of the string; and means common to the aforesaid mechanisms for operating the same in orderly sequence.

13. A machine for applying skirted caps to receptacles including mechanism movable with respect to the receptacles from and toward the receptacles to permit of the application of skirted caps to the mouth portions of the receptacles and operating to hold the caps to such mouth portions; mechanism for forming grooves in fastening elements; mechanism for placing a fastening element of strip material at the skirt of the cap; mechanism for winding string upon the skirt of a cap and within the groove of the fastening element to an extent to have the string overlap within the groove of the fastening element, the mechanism for placing the fastening element at the cap skirt also serving to crimp the walls of said groove crosswise of the string; mechanism for closing the walls of the groove upon and into clamping engagement with the overlapping ends of the string; and means common to the aforesaid mechanisms for operating the same in orderly sequence.

14. A machine for applying skirted caps to receptacles including mechanism movable with respect to the receptacles from and toward the receptacles to permit of the application of skirted caps to the mouth portions of the receptacles and operating to hold the caps to such mouth portions; mechanism for forming grooves in fastening elements; mechanism for placing a fastening element of strip material at the skirt of the cap; mechanism for pulling upon and winding string upon the skirt of a cap and within the groove of the fastening element to an extent to have the string overlap within the groove of the fastening element, the mechanism for placing the fastening element at the cap skirt also serving to crimp the walls of said groove crosswise of the string; mechanism for closing the walls of the groove upon and into clamping engagement with the overlapping ends of the string; and means common to the aforesaid mechanisms for operating the same in orderly sequence.

15. A machine for applying skirted caps to receptacles including mechanism for winding string upon the skirt of a cap and including a string engaging portion that turns substantially upon the axis of the receptacle; mechanism for fastening the ends of the string applied to a cap; and means common to the aforesaid mechanisms for operating the same in orderly sequence.

16. A machine for applying skirted caps to receptacles including mechanism for winding string upon the skirt of a cap to an extent to have the string overlap; mechanism for fastening the ends of the string applied to a cap and including a string engaging portion that turns substantially upon the axis of the receptacle; and means common to the aforesaid mechanisms for operating the same in orderly sequence.

17. A machine for applying skirted caps to receptacles including mechanism for winding string upon the skirt of a cap and including a string engaging portion that turns substantially upon the axis of the receptable; mechanism for coupling a fastening element with the ends of the string to hold the ends of the string in relation; and means common to the aforesaid mechanisms for operating the same in orderly sequence.

18. A machine for applying skirted caps to receptacles including mechanism for winding string upon the skirt of a cap to an extent to have the string overlap and including a string engaging portion that turns substantially upon the axis of the receptacle; mechanism for coupling a fastening element with the ends of the string to hold the ends of the string in relation; and means common to the aforesaid mechanisms for operating the same in orderly sequence.

19. A machine for applying skirted caps to receptacles including mechanism for pulling upon and winding string upon the skirt of a cap and including a string engaging portion that turns substantially upon the axis of the receptacle; mechanism for fastening the ends of the string applied to a cap; and means common to the aforesaid mechanisms for operating the same in orderly sequence.

20. A machine for applying skirted caps to receptacles including mechanism for pulling upon and winding string upon the skirt of a cap to an extent to have the string overlap and including a string engaging portion that turns substantially upon the axis of the receptacle; mechanism for fastening the ends of the string applied to a cap; and means common to the aforesaid mechanisms for operating the same in orderly sequence.

21. A machine for applying skirted caps to receptacles including mechanism for pulling upon and winding string upon the skirt of a cap and including a string engaging portion that turns substantially upon the axis of the receptacle; mechanism for coupling a fastening element with the ends of the string to hold the ends of the string in relation; and means common to the aforesaid mechanisms for operating the same in orderly sequence.

22. A machine for applying skirted caps to receptacles including mechanism for pulling upon and winding string upon the skirt of a cap to an extent to have the string overlap and including a string engaging portion that turns substantially upon the axis of the receptacle; mechanism for coupling a fastening element with the ends of the string to hold the ends of the string in relation; and means common to the aforesaid mechanisms for operating the same in orderly sequence.

23. A machine for applying skirted caps to receptacles including mechanism for placing a fastening element at the skirt of the cap; mechanism for winding string upon the skirt of a cap and the fastening element to an extent to have the string overlap upon the fastening element and including a string engaging portion that turns substantially upon the axis of the receptacle; mechanism for coupling the fastening element with the ends of the string to hold the ends of the string in relation; and means common to the aforesaid mechanisms for operating the same in orderly sequence.

24. A machine for applying skirted caps to receptacles including mechanism for forming grooves in fastening elements; mechanism for placing a fastening element at the skirt of a cap; mechanism for winding string upon the skirt of a cap and within the groove of the fastening element to an extent to have the string overlap within the groove of the fastening element; mechanism for closing the walls of the groove upon and into clamping engagement with the overlapping ends of the string; and means common to the aforesaid mechanisms for operating the same in orderly sequence.

25. A machine for applying skirted caps to receptacles including mechanism for placing a fastening element at the skirt of a cap; mechanism for pulling upon and winding string upon the skirt of a cap and the fastening element to an extent to have the string overlap upon the fastening element and including a string engaging portion that turns substantially upon the axis of the receptacle; mechanism for coupling the fastening element with the ends of the string to hold the ends of the string in relation; and means common to the aforesaid mechanisms for operating the same in orderly sequence.

26. A machine for applying skirted caps to receptacles including mechanism for forming grooves in fastening elements; mechanism for placing a fastening element at the skirt of the cap; mechanism for pulling upon and winding string upon the skirt of a cap and within the groove of the fastening element to an extent to have the string overlap within the groove of the fastening element; mechanism for closing the walls of the groove upon and in clamping engagement with the overlapping ends of the string; and means common to the aforesaid mechanisms for operating the same in orderly sequence.

27. A machine for applying skirted caps to receptacles including mechanism for forming grooves in fastening elements; mechanism for placing a fastening element of strip material at the skirt of the cap; mechanism for winding string upon the skirt of a cap and within the groove of the fastening element to an extent to have the string overlap within the groove of the fastening elment, the mechanism for placing the fastening element at the cap skirt also serving to crimp the walls of said groove crosswise of the string; mechanism for closing the walls of the groove upon and into clamping engagement with the overlapping ends of the string; and means common to the aforesaid mechanisms for operating the same in orderly sequence.

28. A machine for applying skirted caps to receptacles including mechanism for forming grooves in fastening elements; mechanism for placing a fastening element of strip material at the skirt of the cap; mechanism for pulling upon and winding string upon the skirt of a cap and within the groove of the fastening element to an extent to have the string overlap within the groove of the fastening element, the mechanism for placing the fastening element at the cap skirt also serving to crimp the walls of said groove crosswise of the string; mechanism for closing the walls of the groove upon and into clamping engagement with the overlapping ends of the string; and means common to the aforesaid mechanisms for operating the same in orderly sequence.

29. A machine for applying skirted caps to receptacles including mechanism for placing a fastening element at the skirt of the cap; mechanism for winding string upon the skirt of a cap and the fastening element to an extent to have the string overlap upon the fastening element; mechanism for coupling the fastening element with the ends of the string to hold the ends of the string in relation; cutting mechanism for subdividing a stock of material into fastening elements; and means common to the aforesaid mechanisms for operating the same in orderly sequence.

30. A machine for applying skirted caps to receptacles including mechanism for forming grooves in fastening elements; mechanism for placing a fastening element at the skirt of a cap; mechanism for winding string upon the skirt of a cap and within the groove of the fastening element to an extent to have the string overlap within the groove of the fastening element; mechanism for closing the walls of the groove upon and into clamping engagement with the overlapping ends of the string; cutting mechanism for subdividing a stock of material into fastening elements; and means common to the aforesaid mechanisms for operating the same in orderly sequence.

31. A machine for applying skirted caps to receptacles including mechanism for placing a fastening element at the skirt of a cap; mechanism for pulling upon and winding string upon the skirt of a cap and the fastening element to an extent to have the string overlap upon the fastening element; mechanism for coupling the fastening element with the ends of the string to hold the ends of the string in relation; cutting mechanism for subdividing a stock of material into fastening elements; and means common to the aforesaid mechanisms for operating the same in orderly sequence.

32. A machine for applying skirted caps to receptacles including mechanism for forming grooves in fastening elements; mechanism for placing a fastening element at the skirt of the cap; mechanism for pulling upon and winding string upon the skirt of a cap and within the groove of the fastening element to an extent to have the string overlap within the groove of the fastening element; mechanism for closing the walls of the groove upon and in clamping engagement with the overlapping ends of the string; cutting mechanism for subdividing a stock of material into fastening elements; and means common to the aforesaid mechanisms for operating the same in orderly sequence.

33. A machine for applying skirted caps to receptacles including mechanism for forming grooves in fastening elements; mechanism for placing a fastening element of strip material at the skirt of the cap; mechanism for winding string upon the skirt of a cap and within the groove of the fastening element to an extent to have the string overlap within the groove of the fastening element, the mechanism for placing the fastening element at the cap skirt also serving to crimp the walls of said groove crosswise of the string; mechanism for closing the walls of the groove upon and into clamping engagement with the overlapping ends of the string; cutting mechanism for subdividing a stock of material into fastening elements; and means common to the aforesaid mechanisms for operating the same in orderly sequence.

34. A machine for applying skirted caps to receptacles including mechanism for forming grooves in fastening elements; mechanism for placing a fastening element of strip material at the skirt of the cap; mechanism for pulling upon and winding string upon the skirt of a cap and within the groove of the fastening element to an extent to have the string overlap within the groove of the fastening element, the mechanism for placing the fastening element at the cap skirt also serving to crimp the walls of said groove cross wise of the string; mechanism for closing the walls of the groove upon and into clamping engagement with the overlapping ends of the string; cutting mechanism for subdividing a stock of material into fastening elements; and means common to the aforesaid mechanisms for operating the same in orderly sequence.

35. A machine for applying skirted caps to receptacles including mechanism for disposing string upon the skirt of a cap; mechanism for fastening the ends of the string applied to a cap; means for operating the aforesaid mechanisms in orderly sequence; mechanism for setting said means into operation operable by the receptacle; and a support for holding the receptacle in operating relation to the latter mechanism.

36. A machine for applying skirted caps to receptacles including mechanism for disposing string upon the skirt of a cap; mechanism for fastening the ends of the string applied to a cap; means for operating the aforesaid mechanisms in orderly sequence; mechanism for setting said means into operation operable by the receptacle; and a positioner for placing the receptacle in position to have the cap applied thereto and to be in actuating relation with the latter mechanism.

37. A machine for applying skirted caps to receptacles including mechanism movable with respect to the receptacles from and toward the receptacles to permit of the application of skirted caps to the mouth portions of the receptacles and operating to hold the caps to such mouth portions; mechanism for winding string upon the skirt of a cap and including a string engaging portion that turns substantially upon the axis of the receptacle; mechanism for fastening the ends of the string applied to a cap; means for cutting the wound string from the unwound string; and means common to the aforesaid mechanisms for operating the same in orderly sequence.

38. A machine for applying skirted caps to receptacles including mechanism for winding string upon the skirt of a cap and including a string engaging portion that turns substantially upon the axis of the receptacle; mechanism for fastening the ends of the string portion applied to a cap; means for cutting the wound string from the unwound string; and means common to the aforesaid mechanisms for operating the same in orderly sequence.

In witness whereof, I hereunto subscribe my name this 7th day of August, A. D. 1919.

OLOF N. TEVANDER.